Figure 2:
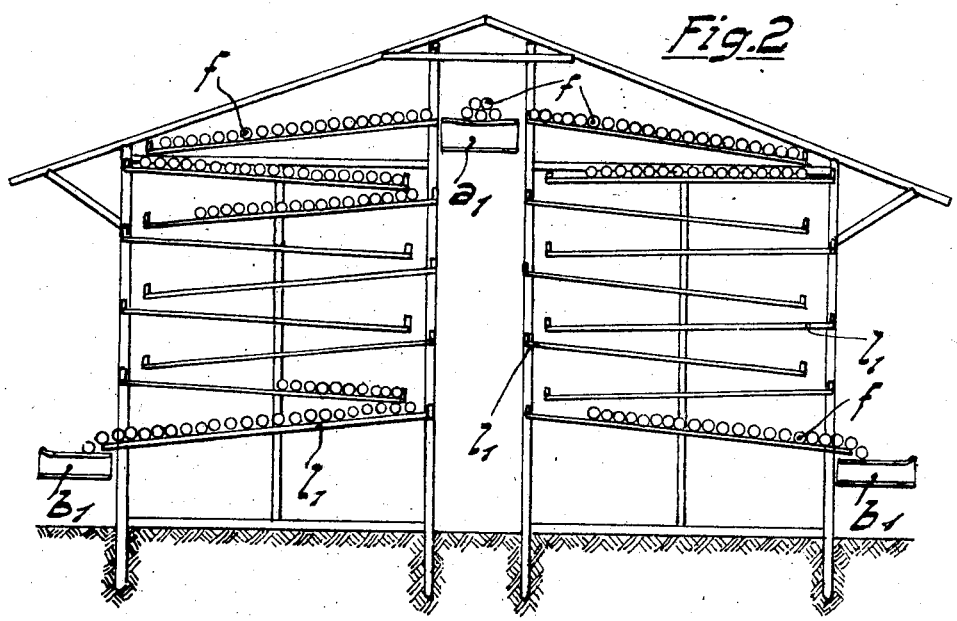

Aug. 20, 1940.  O. LINKER  2,212,444
PROCESS FOR DEHYDRATING PEAT OR THE LIKE
Filed March 30, 1938  2 Sheets-Sheet 1
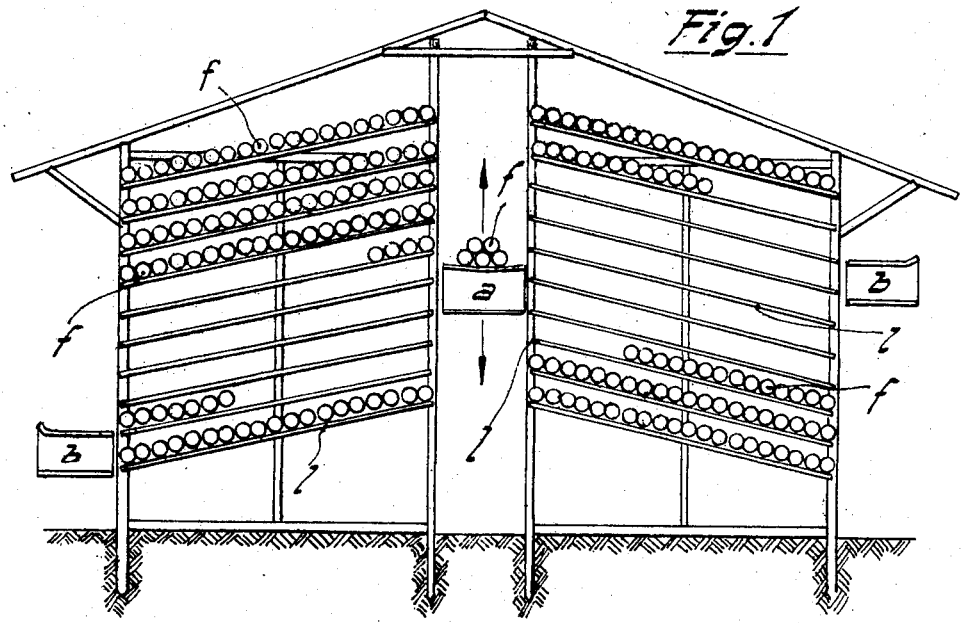
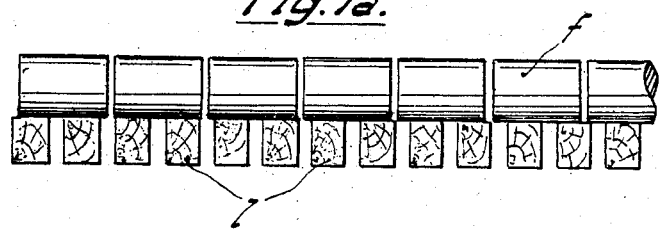
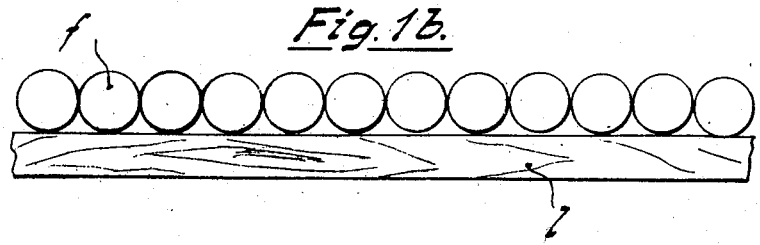

Aug. 20, 1940.　　　　　O. LINKER　　　　　2,212,444
PROCESS FOR DEHYDRATING PEAT OR THE LIKE
Filed March 30, 1938　　　2 Sheets-Sheet 2

Inventor:
Oskar Linker

Patented Aug. 20, 1940

2,212,444

UNITED STATES PATENT OFFICE 2,212,444

PROCESS FOR DEHYDRATING PEAT OR THE LIKE

Oskar Linker, Leipzig, Germany; Herbert Linker executor of Oskar Linker, deceased, assignor of one-half to Zdenko Graf Schönborn, Kout na Sumave, Czechoslovakia Application March 30, 1938, Serial No. 198,993
In Germany September 29, 1937

8 Claims. (Cl. 44—27)

Many processes have already been proposed for the purpose of dehydrating peat, and other subfossil substances, known to contain a high proportion of moisture, but these known processes have been found to be too expensive or intricate, or the degree of dehydration obtained inadequate.

Conditions of particular difficulty are produced, for instance, by the water which the capillaries contain, but also and chiefly by the water which is bound in a colloidal state, for, while the water which the capillaries contain can be removed only by destruction or opening of these vessels, the water which is bound in a colloidal state can be eliminated only by putting an end to the condition of colloidal equilibrium. Even if very great power is employed, the use of pressure leads only to the expulsion of the free water in existence in the peat or like mass, but this free water constitutes only a small fraction of the total quantity of water which is present in the substance.

As is clearly shown by these explanations, it is quite impossible to remove capillary water, and water bound in a colloidal state, by mechanical means.

This invention now aims, first and foremost, at achieving, by biological means, a high degree of dehydration at the lowest possible cost. The process applied for the purpose makes use of the known step of fermenting coarsely broken raw peat or the like by subjection to the action of micro-organisms which release water held by capillary action and in a colloidal state. The invention consists of a particular method of treatment wherein the raw peat is first broken up coarsely, and being generally of an aciduous nature is treated during the breaking up operation to reduce its acidity to the desired pH value and is then inoculated with mixed cultures, which are suitably bred separately, of anaerobic and aerobic micro-organisms acting as cellulose destroying agents, and lastly heaped in layers, in such a way that a new layer is deposited on top of the layer underneath only after a certain rise of temperature has taken place in the latter, so that an extensive dehydration of the mass of peat automatically takes place.

The peat, which has by then lost a large proportion of its water, is heaped afresh, for the purpose of loosening and of ventilation, and is again inoculated by layers with cultures, which are suitably bred separately, of aerobic (thermophilous and thermogenous) micro-organisms. A considerable spontaneous rise of temperature, of up to approximately 50° C., and even up to approximately 70° C. in certain conditions, is thereby brought about, with the consequence that a further portion of the moisture is eliminated by seepage as well as by evaporation.

The mass of peat which has been submitted to this preliminary treatment is thereupon crushed, preferably while it is still warm, and conveyed to an extruding press, which drives the air out of the peat-mass, and from which the latter issues in the form of a rope, which may be cut up into portions. These portions may be given any shape which may be desired, but are most suitably made to be cylindrical or spherical, and are eventually taken to roofed storage sheds, or to open-work drying surfaces where they are left to undergo a process of shrinkage, hardening, and drying.

In the event of it being found that the mass of raw peat does not provide the micro-organism with a suitable breeding medium, the latter can advantageously be provided, in the course of the operation of breaking up the peat, by the addition of appropriate nutritive substances, such as nitrogen, for choice, or by means of an equivalent treatment.

By way of example, a process of treating peat to produce fuel briquettes or blocks will now be described in greater detail. Raw peat is extracted from the bog, by hand digging, by means of dredgers, or in any other suitable manner (no preliminary draining of the bog being required for the purpose), and taken to a coarse crusher, which will, at the same time, eliminate suitably any foreign bodies, such as wood, roots, fibre and the like, which the raw peat may contain, and which cannot be crushed. To the peat is added, in the crushing mill, a quantity of substances reducing its acidity and diluting its acid contents (such as lime or calcium carbonate) and, if necessary, also of nitrogen, or of substances containing nitrogen, (such as nitrate of lime of about 21% nitrogen content) because the small quantities of nitrogen which are present in the peat are only attacked with difficulty by the micro-organisms, and at a rate which is too slow for the further development of the latter.

The coarsely crushed peat is then sent to a fermenting yard, which is so designed that the seepage liquor which forms, and the water discharged by spontaneous dehydration can run off.

The first layer of the fermentation heap is sprayed superficially, by means of a pump or spraying device, with a solution containing, in definite proportions, the active micro-organisms which were prepared separately. To this inoculating liquid, to which may subsequently be added advantageously the seepage liquor which forms, may be added at the same time cellulose destroying agents which are also bred separately. The first layer is then left alone until it has experienced a certain rise of temperature from 30° to 40° C. for instance. This is effected in a matter of a few to several hours, according to the type of peat which is treated.

Immediately after the layer of peat has been deposited on the fermenting yard, and inoculated, the mass of peat is observed to shrink to a considerable extent, owing to the discharge of the water which is actively separated, together with the seepage liquor which is formed and runs off.

It is often advisable, where an establishment for the treatment of peat is put into commission, to spread on the ground of the fermenting yard, below the first layer of peat, a layer of suitable thickness of fresh stable horse-manure, which, as is well known, contains a large proportion of thermophilous and thermogenous micro-organisms, and to assume rapidly a very high temperature, for the purpose of introducing and accelerating the process of fermentation.

After the first layer of peat has been treated in the manner described above, and the increase of temperature referred to above has taken place, a second layer is deposited on to the first, and submitted to the same treatment, and so forth, until a large heap, with a height of 4 to 6 feet or more, has been made. This heap, in the course of time, shrinks to such an extent that it is eventually reduced to one half of its original height. The material at the same time begins to crumble, and loses its character as peat.

When the temperature brings to drop in the first fermenting heap, and spontaneous dehydration has proceeded to the degree which is desirable for the subsequent phase of complementary hot fermentation, the bulk of the mass of peat is broken for the purpose of loosening and of ventilation, and a second heap is made in another part of the fermenting yard. This is again done by layers, as was done in the case of the first heap. Each of the layers is now inoculated with aerobic (thermogenous and thermophilous) micro-organisms, to which other cellulose-destroying agents may again be added. This new heap is then left alone for a few days, and a spontaneous rise of the temperature of the whole mass takes place to 50° C. and in certain conditions even to 70° C., while a further discharge of seepage liquor and of released water, with further evaporation of water, is observed to take place.

The material has, by this time, completely lost its character as peat. Its fibre has further been broken up, and the mass is found to be of a crumbling nature. Dehydration to below 70%, which could be reached through protracted storage in heaps, cannot be recommended, however, because it would cause the portions issuing from the moulding machine to forfeit some of their capacity to contract.

As soon as it is found that the temperature of this heap begins to drop, the peat substance which it contains is sent, in a still fairly warm condition, to a fine grinding mill. The finely ground substance is then allowed to drop directly into, or is conveyed to an extruding mill or press, which, at the same time, drives the air out of the substance, by means of a vacuum which is produced in this machine itself, and draws off the air which the peat contains. This expulsion of air is of importance for the reason that it gives a closer texture to the peat substance extruded in rope form by the machine, and to the portions which are cut therefrom, in the course of shrinkage, hardening, and drying which take place, so that a product having the appearance of coal is produced.

The accompanying drawings illustrate diagrammatically and by way of example two constructions of storage sheds for housing the fuel blocks or briquettes prepared from peat and other subfossil substances in accordance with this invention. In the drawings Figure 1 is a transverse section through a storage shed according to one embodiment of the invention, and Figures 1a and 1b are enlarged views of the gratings for supporting the fuel blocks or briquettes, whilst Figure 2 is a view similar to Figure 1 of a modified construction and Figure 2a is an enlarged view of a part thereof as hereinafter more particularly described.

The fuel bodies $f$ (Figure 1) are conveyed to the lattice grating $l$ by a centrally disposed belt conveyor $a$ which can be raised and lowered. As these fuel bodies are of cylindrical or spherical shape, they roll along the lattice-work $l$ in the manner shown by Figure 1. Owing to the very efficient ventilation which is thus provided, the fuel bodies can thus dry in a comparatively short time. The delivery of fuel-bodies is carried out alternately on the left and on the right of the lattice gratings $l$, and the fuel bodies are removed from storage by outer conveyor belts $b$, which can likewise be raised and lowered, so that row after row of the fuel bodies $f$ can be removed after they have been dried, the belt-conveyors $b$ having merely to be adjusted to the height required for the purpose.

Figure 2A:
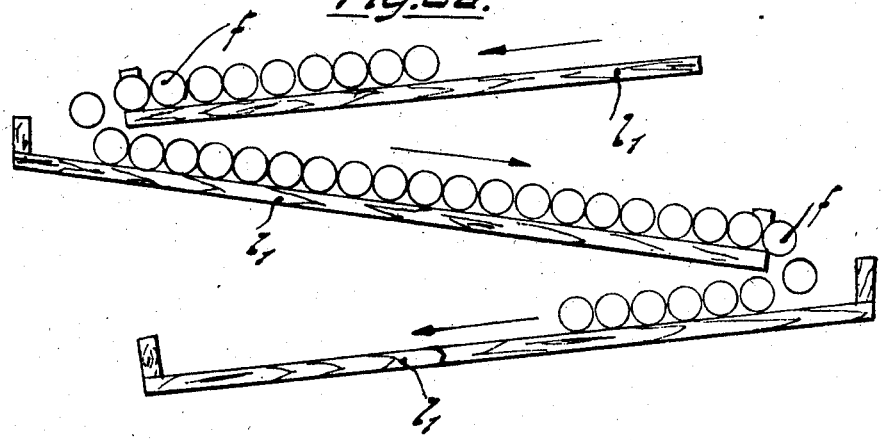

In the construction shown in Figure 2, the fuel-bodies $f$ are arranged on the sloping gratings $h$ which are located one above the other in zig-zag-formation. The fuel-bodies $f$ on the lowermost grating are discharged onto belt conveyors $b_1$ or into trucks or other suitable collecting devices and the load of bodies on each grating is allowed to gravitate on to the next lower grating, so that the topmost grating can receive a load of freshly made fuel bodies $f$.

The drying process may be assisted by artificial means, e. g. by the use of hot air or gases.

I claim:

1. A process for manufacturing high grade fuel from peat or like subfossil substances, consisting in coarsely breaking up said substance as extracted from a bog; forming a layer of said substance; inoculating said layer with micro-organisms which will ferment and cause release of capillary and colloidal water from the substance; permitting fermentation to proceed until a substantial rise in temperature has set in; superimposing successive layers on said first layer, each successive layer when placed being inoculated and allowed to ferment similarly as the first layer; forming the fermented product into blocks, and drying the blocks.

2. A process for manufacturing high grade fuel from peat or like subfossil substances, consisting in coarsely breaking up said substance as extracted from a bog; fermenting the substance in the open air by inoculation with micro-organisms which during fermentation will cause release of capillary and colloidal water from the substance accompanied by a rise in temperature; utilizing said fermented product in a second step of fermentation effected by inoculation with micro-organisms existent at higher temperatures; forming the products of the second step into blocks; and drying the blocks.

3. A process according to claim 2, wherein the fermentation of the first step is effected by mixed cultures of anaerobic and aerobic micro-organisms added to the substance; and wherein fermentation of the second step is effected by aerobic thermophilous and thermogenous micro-organisms.

4. A process for manufacturing high grade fuel from peat or like subfossil substances, consisting in coarsely breaking up the substance as extracted from the bog, forming a layer of said peat; inoculating said layer with micro-organisms which will ferment and cause release of capillary and colloidal water from the substance; permitting fermentation to proceed until a substantial rise in temperature has set in; superimposing successive layers on said first layer to form a heap, each successive layer being individually subjected to fermentation similarly to the first layer; breaking up said heap and utilizing the fermented product thereof to form layers of a second similar heap in which each layer is inoculated with micro-organisms existent at higher temperatures; permitting said second heap to remain under warm-fermentation at said higher temperature until the rise of temperature is complete; forming the warm fermented product into blocks; and drying the blocks.

5. A process according to claim 4, wherein the first layer of said first heap is spread upon fresh animal manure.

6. A process according to claim 4, wherein the fermentation in the first heap is effected by mixed cultures of anaerobic and aerobic micro-organisms; and wherein fermentation in the second heap is effected by aerobic thermophilous and thermogenous micro-organisms.

7. A process of treatment of peat or other subfossil substances to produce high grade fuel, consisting in coarsely breaking up the raw substance as extracted from a bog, adding chemicals for reducing the acidity and for increasing the nitrogen content of the raw substance; forming said treated substance into successive layers in a heap, each layer in succession being inoculated with mixed cultures of anaerobic and aerobic micro-organisms, whereby each successive layer of peat experiences a moderate amount of spontaneous rise of temperature together with energetic dehydration and partial breaking-down fibre of the cellulose constituents thereof; utilizing the above dehydrated mass to form a second layered heap, each layer of which is inoculated with aerobic thermophilous and thermogenous organisms, whereby the mass is further dehydrated while being spontaneously heated to a higher degree, accompanied with further breaking down of the fibres of the cellulose constituents, thereby producing a mass of crumbly consistency; grinding the mass; forming the ground mass into blocks; permitting the blocks to shrink; and finally hardening and drying the blocks.

8. A process according to claim 7, wherein the first layer of said first heap is spread upon fresh animal manure.

OSKAR LINKER.